United States Patent
Marupaduga

(10) Patent No.: US 12,375,982 B1
(45) Date of Patent: Jul. 29, 2025

(54) DELAYING HANDOVERS IN 5G EN-DC NETWORKS BASED ON CARRIER AGGREGATION CAPABILITIES

(71) Applicant: Sprint Spectrum LP, Overland Park, KS (US)

(72) Inventor: Sreekar Marupaduga, Overland Park, KS (US)

(73) Assignee: Sprint Spectrum LP, Overland Park, KS (US)

( * ) Notice: Subject to any disclaimer, the term of this patent is extended or adjusted under 35 U.S.C. 154(b) by 399 days.

(21) Appl. No.: 17/094,135

(22) Filed: Nov. 10, 2020

(51) Int. Cl.
   *H04W 36/14* (2009.01)
   *H04W 36/00* (2009.01)
   *H04W 36/36* (2009.01)
   *H04W 88/06* (2009.01)

(52) U.S. Cl.
   CPC ..... *H04W 36/00698* (2023.05); *H04W 36/14* (2013.01); *H04W 36/362* (2023.05); *H04W 88/06* (2013.01)

(58) Field of Classification Search
   CPC . H04W 36/0069; H04W 36/14; H04W 36/36; H04W 88/06
   See application file for complete search history.

(56) References Cited

U.S. PATENT DOCUMENTS

| | | | |
|---|---|---|---|
| 9,615,300 B1* | 4/2017 | Marupaduga | H04W 36/0085 |
| 10,548,056 B1* | 1/2020 | Sung | H04W 36/0066 |
| 10,555,231 B2 | 2/2020 | Ahluwalia | |
| 10,743,232 B1* | 8/2020 | Mehta | H04W 36/30 |
| 10,779,198 B1* | 9/2020 | Oroskar | H04W 36/00837 |
| 11,026,138 B1* | 6/2021 | Marupaduga | H04W 72/0453 |
| 2003/0061351 A1* | 3/2003 | Prathima | H04W 72/0453 709/226 |
| 2012/0093128 A1* | 4/2012 | Song | H04W 36/08 370/331 |
| 2012/0202501 A1* | 8/2012 | Morioka | H04W 36/08 455/436 |
| 2014/0328318 A1* | 11/2014 | Sundararajan | H04W 40/248 370/331 |
| 2016/0242090 A1* | 8/2016 | Chen | H04W 36/28 |
| 2017/0094563 A1* | 3/2017 | Yang | H04W 36/0005 |
| 2017/0181048 A1* | 6/2017 | Shah | H04L 65/1016 |
| 2019/0007877 A1* | 1/2019 | Keller | H04W 36/26 |
| 2019/0124572 A1* | 4/2019 | Park | H04W 40/24 |
| 2019/0150042 A1* | 5/2019 | Srivastava | H04W 36/0079 455/436 |
| 2020/0351799 A1* | 11/2020 | Kwok | H04W 76/16 |
| 2022/0050721 A1* | 2/2022 | Chen | G06F 9/5044 |

\* cited by examiner

*Primary Examiner* — Lester G Kincaid
*Assistant Examiner* — Dung L Lam
(74) *Attorney, Agent, or Firm* — Jones Robb PLLC

(57) ABSTRACT

Methods and systems for preventing or delaying handovers to target access nodes that have limited carrier aggregation capabilities, in dual-connectivity (EN-DC) wireless networks, by adjusting handover thresholds to delay the handover of the wireless device to the target access node, for wireless devices reporting high uplink buffer sizes.

19 Claims, 6 Drawing Sheets

---

DETERMINE THAT WIRELESS DEVICE ATTACHED TO SOURCE ACCESS NODE REPORTS UPLINK BUFFER SIZE ABOVE THRESHOLD
810

↓

DELAY HANDOVER OF WIRELESS DEVICE TO TARGET ACCESS NODES CAPABLE OF AGGREGATING FEWER CARRIERS
820

DELAYING HANDOVERS IN 5G EN-DC NETWORKS BASED ON CARRIER AGGREGATION CAPABILITIES

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. As wireless technology continues to improve, various different iterations of radio access technologies (RATs) may be deployed within a single wireless network. Such heterogeneous wireless networks can include newer 5G and millimeter wave (mm-Wave) networks, as well as older legacy networks (such as 3G). In some cases, deployment of 5G new radio (NR) access nodes alongside or co-located with 4G long-term evolution (LTE) access nodes utilizes dual connectivity technology (e.g. EN-DC), wherein control information is transmitted using the 4G RAT and data is transmitted using the 5G RAT. There are various potential deployments of EN-DC, such as one-to-one (where a 4G eNodeB is colocated with a 5G gNodeB at the same cell site or radio access network), or one-to-many (where a 4G eNodeB at a first radio access network is coupled via X2 links to many different 5G gNodeBs, each within their own radio access network or cell site). Each radio access network (RAN) or cell site can further include a cell site router, which provides connectivity to other network elements, such as an intermediate or core network. The connection between the cell site router and other network elements closer to the core network may be referred to as a mobile backhaul.

Further, as wireless device technology improves, increasing numbers of wireless devices are using various transmission modes dual connectivity and multiple input multiple output (MIMO). However, transitioning to these advanced technologies in today's heterogenous wireless networks can be associated with problems. In particular, load balancing of wireless devices between two or more neighboring access nodes having different capabilities can be problematic, particularly when the wireless devices have a high uplink usage. For example, performing handovers of high-usage wireless devices can negatively impact a quality of service for the wireless device, even when the signal levels of a target access node may be more desirable. This is magnified when the target access node is unable to provide a level of service as the source access node. For example, access nodes can be configured to aggregate carriers (using, for example, carrier aggregation), and if a source access node is capable of aggregating more carriers than a target access node, then a handover to the target access node may cause a reduced quality of service. Particularly when many wireless devices, and operating in dual-connectivity mode, the quality of service for the wireless devices can be impacted. Thus, standard handovers of these wireless devices, which may be triggered by poor or deteriorating signal conditions from a serving access node, would not benefit the wireless devices if the target access nodes are capable of aggregating fewer carriers, despite providing better signal conditions.

Overview

Exemplary embodiments described herein include methods, systems, and processing nodes for preventing or delaying handovers to target access nodes that are capable of aggregating fewer carriers than a source access node, particularly for wireless devices exhibiting high uplink usage. An exemplary method for delaying handovers to access nodes based on a carrier aggregation capability includes determining that a target access node is capable of aggregating a smaller quantity of carriers than a source access node serving a wireless device, and delaying a handover of the wireless device to the target access node.

Another exemplary method for delaying handovers to target access nodes with limited carrier-aggregation capabilities includes identifying one or more target access nodes within range of a wireless device attached to a source access node, and limiting handovers of the wireless device to target access nodes that are configured to aggregate fewer carriers than the source access node.

Another exemplary method for adjusting handover thresholds for wireless devices with high uplink buffers includes identifying one or more target access nodes within range of a wireless device attached to a source access node, and adjusting handover thresholds associated with target access nodes capable of aggregating fewer carriers than the source access node, wherein a handover of the wireless device to the target access node is delayed due to the adjusted handover thresholds.

The exemplary embodiments described herein may be performed by a processing node within a system, such as a telecommunication system. Exemplary systems for delaying handovers can include processing nodes that are configured to perform any of the disclosed operations in various combinations. For example, a processing node for delaying handovers to access nodes based on a carrier aggregation capability is configured to perform operations including determining that a target access node is capable of aggregating a smaller quantity of carriers than a source access node serving a wireless device, and delaying a handover of the wireless device to the target access node.

An exemplary processing node for delaying handovers to target access nodes with limited carrier-aggregation capabilities is configured to perform operations including identifying one or more target access nodes within range of a wireless device attached to a source access node, and limiting handovers of the wireless device to target access nodes that are configured to aggregate fewer carriers than the source access node.

An exemplary processing node for adjusting handover thresholds for wireless devices with high uplink buffers is configured to perform operations including identifying one or more target access nodes within range of a wireless device attached to a source access node, and adjusting handover thresholds associated with target access nodes capable of aggregating fewer carriers than the source access node, wherein a handover of the wireless device to the target access node is delayed due to the adjusted handover thresholds.

DETAILED DESCRIPTION

Figure 1:
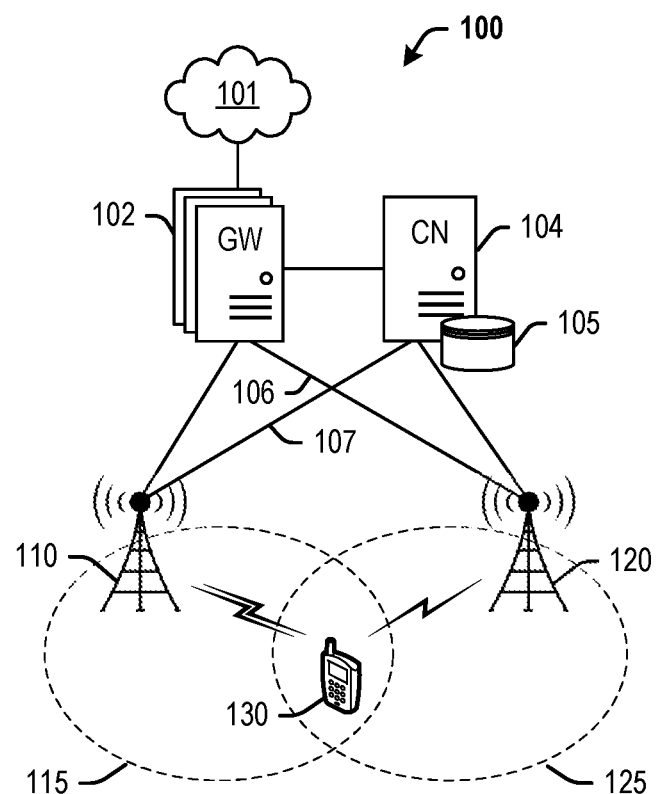
FIG. 1 depicts an exemplary system for delaying handovers based on carrier aggregation capabilities.

The following disclosure provides methods and systems for delaying handovers of wireless devices with high uplink usage to target access nodes that are incapable of aggregating carriers, or capable of aggregating fewer carriers than the source access node. The handover may initially be required if signal conditions change for the wireless device, or via any other known mechanism for triggering a handover. However, if the target access node aggregates fewer carriers than a threshold, or than the source access node, then the high-uplink-usage wireless device may be better-served by remaining attached to the source access node. Thus, the handover is delayed by, for example, modifying the signal condition thresholds, e.g. minimum or maximum signal levels. If the handover is triggered again based on the adjusted handover thresholds then it may be performed as required. However, these operations ensure that wireless devices with higher uplink usage remain attached to access nodes capable of aggregating more carriers, thus ensuring that the uplink data is transmitted entirely without interruption. Various combinations of these operations are described herein, including in collocated EN-DC systems (comprising a 4G LTE eNodeB and 5G NR gNodeB within the same radio access network or RAN), and distributed or one-to-many EN-DC systems (comprising a 4G LTE eNodeB at a first RAN, and different 5G gNodeBs at different RANs respectively).

Delaying handovers can include adjusting handover thresholds. A signal quality reported by the wireless device is monitored, wherein the handover thresholds are adjusted such that the signal quality does not deteriorate past a threshold. For example, if a target access node is incapable of aggregating carriers (or fewer carriers than the source access node), then a handover threshold associated with the target access node is raised, such that a handover of the wireless device to the target access node is prevented or discouraged. Adjusting the handover threshold may include increasing or raising a threshold signal level associated with the target access node. The adjustment may further comprise decreasing or lowering a threshold signal level of the source (or serving) access node, such that the wireless device remains attached to the serving access node for a longer time.

Therefore, as described herein, a processing node (communicably coupled to, for example, a serving or source access node) is configured to perform operations including determining that a target access node is capable of aggregating a smaller quantity of carriers than a source access node serving a wireless device, and delaying a handover of the wireless device to the target access node. It can further be determined that the wireless device reports a buffer size meeting a threshold prior to (or as a condition prior to) delaying the handover. Further, the buffer size can be monitored for a configurable time duration, and an average buffer size determined over the configurable time duration as meeting the threshold. The uplink buffer size can be determined using buffer status reports transmitted from the wireless device, or any other method to determine uplink buffer size.

In exemplary embodiments described herein, the wireless device and source access node are configured to utilize a dual-connectivity operating mode with at least two different radio access technologies (RATs). For example, access nodes described herein can communicate using a plurality of radio air interfaces. For example, the access node can include a combination of a 4G eNodeB and a 5G gNodeB. In other words, the access node can be configured to communicate using 4G LTE as well using 5G NR. Further, the access node can include a plurality of antennae (or antenna elements). Each antenna element can be configured to deploy a different radio air interface using a different frequency. For example, each antenna element can be configured to deploy a 4G LTE air interface or a 5G NR air interface. Different quantities of antenna elements can be configured to deploy (or "assigned" to) a different type of air interface, depending on the needs of a network operator or users.

Thus, the carriers being aggregated at each of the source and target access nods may be configured to utilize at least one of the two RATs. In an exemplary embodiment, how many different carriers utilizing 5G NR can be aggregated as a measure of whether or not to delay the handover. For example, the wireless device can be attached to a primary access node via the first RAT (e.g. 4G LTE), and both source and target access nodes comprise secondary access nodes configured to utilize the second RAT (i.e. 5G NR). In other words, the source access node comprises a primary access node, and the target access node comprises a secondary access node in a one to many configuration, such that the handover is performed between two secondary access nodes. Further, if the source access node can aggregate a larger quantity of 5G carriers than target access node, then the handover is delayed. Mechanics of the handover, such as signaling, threshold adjustment, etc. may be performed using a signaling ratio bearer (SRB). In some embodiments, both source and target access nodes comprise primary access nodes configured to utilize at least the first RAT. For example, source and target access nodes comprises separate dual-connectivity access nodes, either capable of deploying both first and second RATs, or attached to their own secondary access nodes.

Further, delaying the handover comprises adjusting handover thresholds associated with one or both of a source access node or the target access node. Adjusting the handover thresholds can be performed iteratively based on a difference between the quantities of carriers aggregated by each access node. These operations may be performed by an exemplary system described herein and comprising at least a processing node and a processor coupled to the processing node, and similar operations may be performed by a processing node communicatively coupled to any other network node within the wireless network. These and other embodiments are further described herein and with reference to FIGS. 1-8.

FIG. 1 depicts an exemplary system 100 comprising a communication network 101, gateway 102, controller node 104, access nodes 110, 120, and wireless device 130. In this exemplary embodiment, each of access nodes 110, 120 may be configured to deploy at least two wireless air interfaces, including 4G LTE and 5G NR. Each wireless air interface may be configured to utilize a different frequency band or sub-band, a different channel size or bandwidth, and so on. For example, the 5G NR interface may be configured to utilize higher frequencies and larger channel bandwidths than the 4G LTE interface. Further, each access node 110, 120 can be configured to deploy at least two wireless air interfaces using dual connectivity. For example, each access node 110, 120 can include a combination of an eNodeB and a gNodeB, such that each access node is configured to deploy a wireless air interface using a first RAT (e.g. 4G LTE) and a second RAT (e.g. 5G NR). Further, each access node 110, 120 can be configured to communicate using both RATs at the same time. For example, dual connections can be set up with wireless device 130 using both 4G and 5G wireless air interfaces, with the 4G wireless air interface being used to transmit control information, and the 5G wireless air interface being used to transmit data information. In another example, either control or data transmissions may be transmitted using either 4G or 5G wireless air interface. In another example, a standalone 5G access node may be configured to deploy multiple 5G wireless air interfaces. Further, each of access nodes 110, 120 can be configured to perform carrier aggregation. For example, a gNodeB portion of each access node 110, 120 can be configured to aggregate two or more 5G NR carriers, to which a 5G NR transceiver in wireless device 130 can attach. Other implementations may be evident to those having ordinary skill in the art in light of this disclosure. Further, while access nodes 110, 120 and wireless device 130 are illustrated in FIG. 1, system 100 can include various other combinations of carriers/wireless air interfaces, antenna elements, access nodes, and wireless devices, as may be evident to those having ordinary skill in the art in light of this disclosure.

A processing node within system 100 (for example, communicatively coupled to access node 110 or any other network node) can be configured to determine that a target access node (e.g. access node 120) is capable of aggregating a smaller quantity of carriers than a source access node (e.g. access node 110) serving wireless device 130, and delaying a handover of the wireless device 130 to the target access node. It can further be determined that the wireless device 130 reports a buffer size meeting a threshold prior to (or as a condition prior to) delaying the handover. Further, the buffer size can be monitored for a configurable time duration, and an average buffer size determined over the configurable time duration as meeting the threshold. Delaying the handover comprises adjusting handover thresholds associated with one or both of source access node 110 or the target access node 120. In LTE and 5G systems, such a pair of triggers is known as an A4 measurement. Other combinations of handover triggers may be within the purview of those having ordinary skill in the art in light of this disclosure. In an exemplary embodiment, the triggers may comprise thresholds, offsets, or hysteresis values for an A4 measurement event, A5 measurement event, B1 measurement event, or B2 measurement event (e.g., when implementing an LTE network). For example, in an A5 event, a received first signal level plus a hysteresis may be compared to a first threshold and a received second signal level plus offsets minus a hysteresis may be compared to a second threshold. The first received signal level may comprise a received signal level from the first access node and the second received signal level may comprise a received signal level from a target access node, where the first and seconds signals are received at the wireless device 130. Some example signal levels may comprise a Received Signal Strength Indicator, (RSSI), Reference Signal Received Quality (RSRQ), RSRP, or any other suitable signal level.

The adjusted handover thresholds are transmitted to the wireless device 130. A signal quality reported by the wireless device 130 is monitored, and the handover thresholds are adjusted such that the signal quality does not deteriorate past a threshold. In an exemplary embodiment, the handover threshold comprise a signal level that is adjusted from −102 dBm to −110 dBm. For example, the wireless device 130 may be near a cell edge of the source access node (e.g. access node 110) and, therefore, request a handover to an adjacent neighboring target access node (e.g. access node 120). Further, adjusting the handover thresholds can be performed iteratively based on different threshold quantities of aggregated carriers. For example, access node 120 may be configured to aggregate a below-threshold quantity of carriers, and the threshold quantity may be predefined or based on the quantity of carriers deployed by source access node 110. Thus it is desirable to delay the handover as long as possible.

Access nodes 110, 120 can be any network node configured to provide communication between wireless device 130 and communication network 101, including standard access nodes such as a macro-cell access node, base transceiver station, a radio base station, an eNodeB device, an enhanced eNodeB device, a next generation or gigabit NodeB device (gNodeB) in 5G networks, or the like. In an exemplary embodiment, a macro-cell access node can have a coverage area 115, 125 in the range of approximately five kilometers to thirty-five kilometers and an output power in the tens of watts. Alternatively, access nodes 110, 120 may comprise any short range, low power, small-cell access nodes such as a microcell access node, a picocell access node, a femtocell access node, or a home eNodeB/gNodeB device.

Access nodes 110, 120 can comprise a processor and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other, and other access nodes (not shown), using a wireless link or a wired link such as an X2 link. Components of exemplary access nodes 110, 120 and processing nodes coupled thereto are further described with reference to FIGS. 2-3.

Wireless device 130 may be any device, system, combination of devices, or other such communication platform capable of communicating wirelessly with access nodes 110, 120 using one or more frequency bands deployed therefrom. Wireless device 130 may be, for example, a mobile phone, a wireless phone, a wireless modem, a personal digital assistant (PDA), a voice over internet protocol (VOIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 130. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path-including combinations thereof. Communication links 106, 107 can be wired or wireless and use various communication protocols such as Internet, Internet protocol (IP), local-area network (LAN), S1, optical networking, hybrid fiber coax (HFC), telephony, T1, or some other communication format-including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication links 106, 107 can be a direct link or might include various equipment, intermediate components, systems, and networks, such as a cell site router, etc. Communication links 106, 107 may comprise many different signals sharing the same link. Communication links 106, 107 may traverse and/or interface with many different reference points, such as n1, n2, n3, n4, n5, n6, n7, etc., as well as s1, s3, s4, s5, etc.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW) associated with 4G LTE networks, or a user plane function (UPF) associated with 5G NR networks. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a session management function (SMF), access and mobility function (AMF), a home subscriber server (HSS), a policy control and charging rules function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as capabilities of access nodes 110, 120, past or current uplink usage requirements capabilities of wireless device 130, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 120, controller node 104, and/or network 101.

Figure 2:
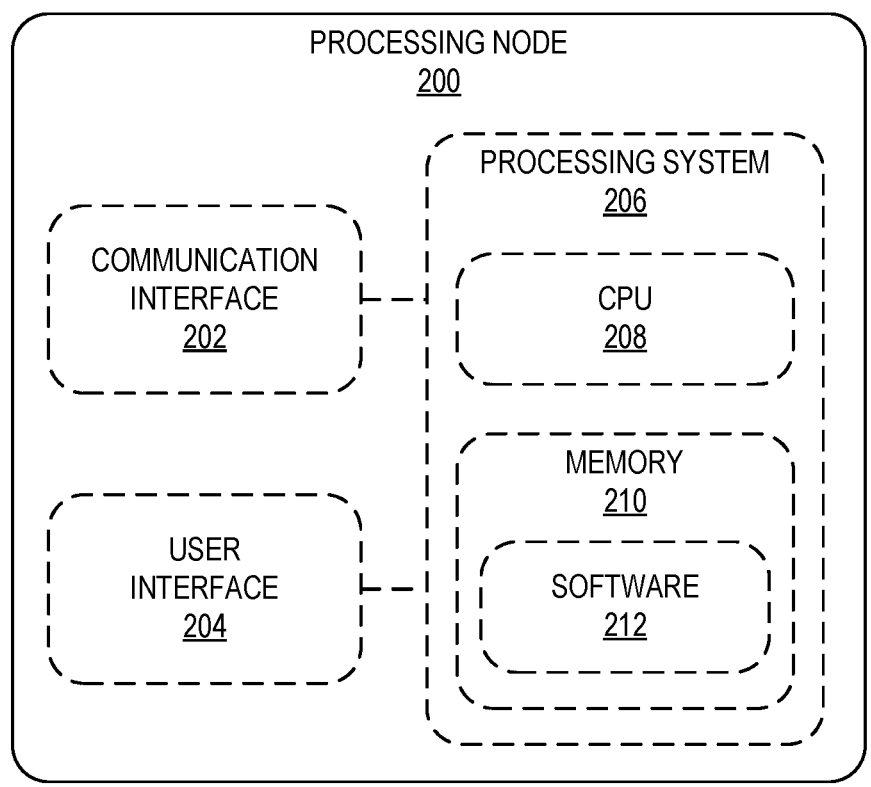
FIG. 2 depicts an exemplary processing node for delaying handovers based on carrier aggregation capabilities.

FIG. 2 depicts an exemplary processing node 200. Processing node 200 comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Further, memory 210 can store a software 212, which may be executed to perform the operations described herein. In an exemplary embodiment, software 212 can include instructions for delaying handovers to access nodes based on a carrier aggregation capability by determining that a target access node is capable of aggregating a smaller quantity of carriers than a source access node serving a wireless device, and delaying a handover of the wireless device to the target access node.

In another exemplary method, software 212 can include instructions for delaying handovers to target access nodes with limited carrier-aggregation capabilities by identifying one or more target access nodes within range of a wireless device attached to a source access node, and limiting handovers of the wireless device to target access nodes that are configured to aggregate fewer carriers than the source access node.

In another exemplary method, software 212 can include instructions for adjusting handover thresholds for wireless devices with high uplink buffers includes identifying one or more target access nodes within range of a wireless device attached to a source access node, and adjusting handover thresholds associated with target access nodes capable of aggregating fewer carriers than the source access node, wherein a handover of the wireless device to the target access node is delayed due to the adjusted handover thresholds.

Figure 3:
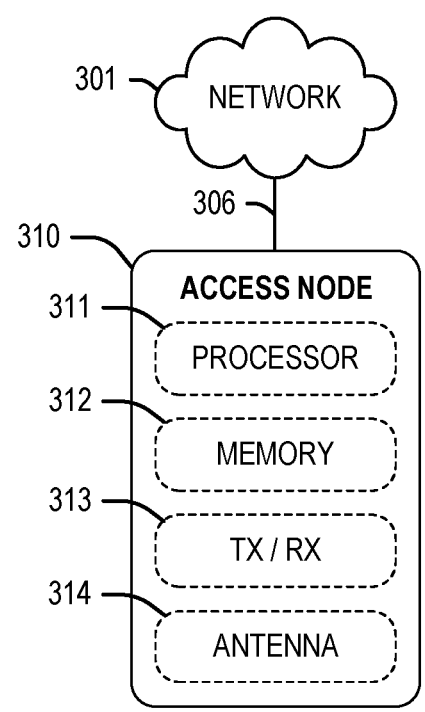
FIG. 3 depicts an exemplary access node for delaying handovers based on carrier aggregation capabilities.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, a transceiver 313, and antennae 314 (hereinafter referred to as antenna elements 314). Processor 311 executes instructions stored on memory 312, and transceiver 313 (in conjunction with antenna elements 314) enable wireless communication respectively at least two wireless air interfaces, such as 4G LTE and 5G NR. For example, access node 310 may be configured to transmit control information using a first set of antennae elements 314 configured to utilize a 4G LTE interface, and data information using a second set of antennae elements 314 configured to utilize a 5G NR air interface. Alternatively or in addition, each separate air interface maintains its own control and data transmissions. Further, antenna elements 314 may include an array of antenna elements that are configured to deploy air interfaces over one or more wireless sectors, form beams within these sectors, employ multiple-input-multiple-output (MIMO), etc. Different carriers deployed via antenna elements 314 using different frequencies can be aggregated using by a scheduler coupled to or included within memory 312. The carriers can use different frequency bands (inter-band carrier aggregation) or adjacent frequencies within a frequency band (intra-band carrier aggregation), and can be configured to use the same or different wireless interfaces. For example, multiple carriers using 5G NR can be aggregated.

Exemplary instructions stored on memory 312 can include instructions for delaying handovers of wireless devices with high uplink usage to target access nodes that are incapable of aggregating carriers, or capable of aggregating fewer carriers than the source access node. The handover may initially be required if signal conditions change for the wireless device, or via any other known mechanism for triggering a handover. However, if the target access node aggregates fewer carriers than a threshold, or than the source access node, then the high-uplink-usage wireless device may be better-served by remaining attached to the source access node. Thus, the handover is delayed by, for example, modifying the signal condition thresholds, e.g. minimum or maximum signal levels. If the handover is triggered again based on the adjusted handover thresholds then it may be performed as required. However, these operations ensure that wireless devices with higher uplink usage remain attached to access nodes capable of aggregating more carriers, thus ensuring that the uplink data is transmitted entirely without interruption.

Figure 4:
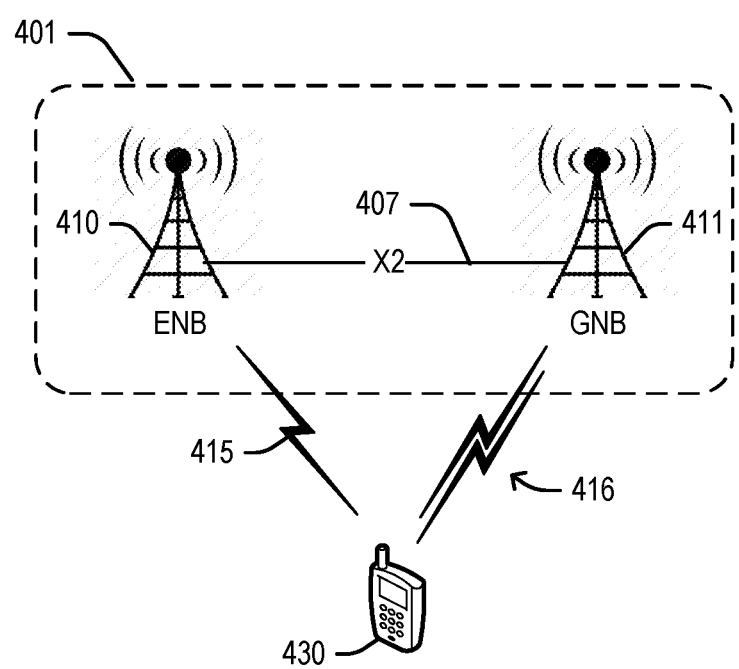
FIG. 4 depicts an exemplary 5G EN-DC radio access network comprising collocated access nodes.

FIG. 4 depicts an exemplary 5G EN-DC radio access network (RAN) 401 with colocated access nodes. RAN 401 can include other components not shown herein for convenience, such as cell site routers, controllers, etc. Further, RAN 401 may be connected to other intermediate or core networks. In this exemplary embodiment, the collocated access nodes can include a eNodeB 410, and a gNodeB 411. For example, eNodeB 410 can be configured to deploy a wireless air interface 415 using a first radio access technology (RAT), e.g. 4G LTE, and gNodeB 411 can be configured to deploy a second wireless air interface 416 using a second RAT, e.g. 5G NR and/or mmW. Each RAT can be configured to utilize a different frequency band or sub-band, a different channel size or bandwidth, and so on. For example, the 5G NR wireless air interface 416 can be configured to utilize higher frequencies and larger channel bandwidths than the 4G LTE wireless interface 415.

Further, eNodeB 410 and gNodeB 411 can be configured to communicate using both RATs at the same time. For example, dual connections can be set up with wireless device 430 using both 4G and 5G wireless air interfaces 415, 416 respectively, the 4G wireless air interface 415 being used to transmit control information, and the 5G wireless air interface 416 being used to transmit data information. For example, a processing node within RAN 401 (for example, communicatively coupled to eNodeB 410, gNodeB 411, or any other network node) can be configured to determine whether or not wireless device 430 is capable of communicating using both RATs (e.g. capable of 5G EN-DC), and instruct the eNodeB 410 to broadcast an indicator in, for example, a system information message. Responsive to the indicator, wireless device 430 can attach to eNodeB 410 which can use the 4G carrier to control and set up a dual connectivity session with the wireless device 430. In other words, control information (including SIB messages) is transmitted from the eNodeB 410 using the 4G LTE air interface, while the 5G NR air interface is utilized for transmission of data via gNodeB 411. Using the 5G RAT for data transmissions is advantageous, as 5G provides higher bandwidths and frequencies versus 4G. In addition, while different carriers offer different channel bandwidths, certain combinations of carriers may provide a greater aggregate channel bandwidth. Combinations of carriers can be aggregated as shown by, for instance, gNodeB 411 deploying multiple aggregated carriers over 5G NR wireless air interface 416.

Further, within radio access network 401, eNodeB 410 and gNodeB 411 can be coupled via a direct communication link 407, which can include an X2 communication link for communicating control and data information. In an exemplary embodiment, gNodeB 411 includes logic to determine how to allocate data packets between eNodeB 410 and gNodeB 411, wherein the data packets flow between wireless device 430 and any external network node. Such logic may include a packet data convergence protocol (PDCP) function. Thus, RAN 401 can include a plurality of antenna elements (not shown herein) coupled to eNodeB 410 and gNodeB 411, with different antenna elements configured to deploy a different radio air interface using a different frequency.

Figure 5:
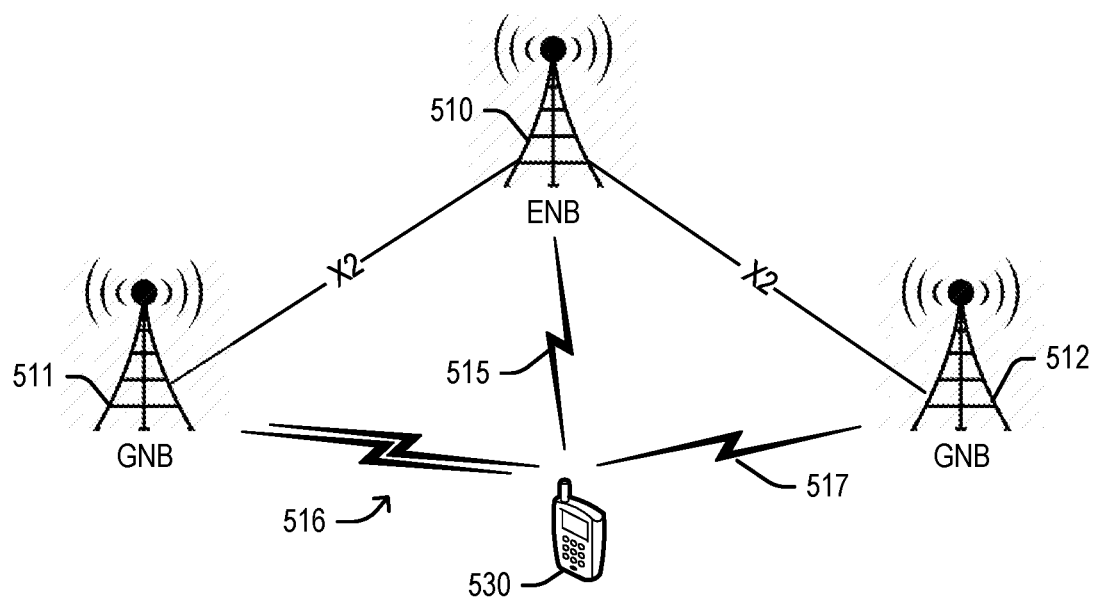
FIG. 5 depicts an exemplary 5G EN-DC radio access network comprising distributed access nodes.

FIG. 5 depicts another 5G EN-DC system using distributed access nodes. Each of RANs 501, 502, 503 includes at least one access node. This embodiment depicts a one-to-many configuration, in which an eNodeB 510 is designated as a primary access node for wireless devices (such as wireless device 530), and one or more gNodeBs 511, 512 are selected as secondary access nodes, as further described below. Persons having ordinary skill in the art may note that other components may be included in any combination, without materially affecting the scope and spirit of the described embodiments.

In this exemplary embodiment, eNodeB 510 can be configured to deploy a wireless interface 515 using a first radio access technology (RAT), e.g. 4G LTE, and gNodeBs 511, 512 can be configured to deploy wireless interfaces using a second RAT, e.g. 5G NR. Further, eNodeB 510 and gNodeBs 511, 512 can be configured to communicate using both RATs at the same time. For example, dual connections can be set up with one wireless device 530 using both 4G and 5G air interfaces respectively, the 4G wireless interface 515 being used to transmit control information, and one of the 5G wireless interfaces (e.g. 5G wireless interface 516) being used to transmit data information. For example, a processing node communicatively coupled to eNodeB 510 can be configured to determine whether or not wireless device 530 is capable of communicating using both RATs (e.g. capable of 5G EN-DC), and instruct the eNodeB 510 to broadcast an indicator in, for example, a system information message. Responsive to the indicator, wireless device 530 can attach to eNodeB 510 which can use the 4G carrier to control and set up a dual connectivity session with wireless device 530. Further, eNodeB 510 can be configured to select one (or more) of gNodeBs 511, 512 as a secondary access node, to transport user data. In other words, control information (including SIB messages) is transmitted from the eNodeB node 510 using the 4G LTE air interface, while the 5G NR air interfaces (e.g. 5G NR wireless air interface 516) is utilized for transmission of data. Further, gNodeBs 511 and 512 (hereinafter "secondary access nodes") can each be coupled to eNodeB 510 (hereinafter "primary access node") via X2 communication links. In an exemplary embodiment, each secondary access node can include logic to determine how to allocate data packets between the access nodes, wherein the data packets flow between wireless device 530 and a network node not shown herein. Such logic may include a packet data convergence protocol (PDCP) function. Further, at least gNodeB 511 can be configured to perform carrier aggregation by, for example, aggregating two or more 5G NR carriers over wireless air interface 516, to which a 5G NR transceiver in wireless device 530 can attach.

Further, a processing node communicatively coupled to any of eNodeB 510 or gNodeB 511 can be configured to delay a handover to gNodeB 512 by determining that gNodeB 512 is capable of aggregating a smaller quantity of carriers than a source access node to which wireless device 530 is attached (e.g. gNodeB 511), and delaying a handover of the wireless device 530 to the gNodeB 512. It can further be determined that wireless device 530 reports a buffer size meeting a threshold prior to (or as a condition prior to) delaying the handover. The reporting can be performed via buffer status reports (BSRs). Further, the buffer stats reports can be monitored for a configurable time duration, and an average buffer size determined over the configurable time duration as meeting the threshold. Delaying the handover comprises adjusting handover thresholds associated with one or both of gNodeB 511 (the source access node) or gNodeB 512 (the target access node). Eventually, a handover is performed after a time sufficient for wireless device 530 to reduce its uplink usage by, for example, emptying the uplink buffer.

Various other combinations of these operations may be envisioned by those having ordinary skill in the art in light of this disclosure, including the operations further described below with reference to FIGS. 6-8.

Figure 6:
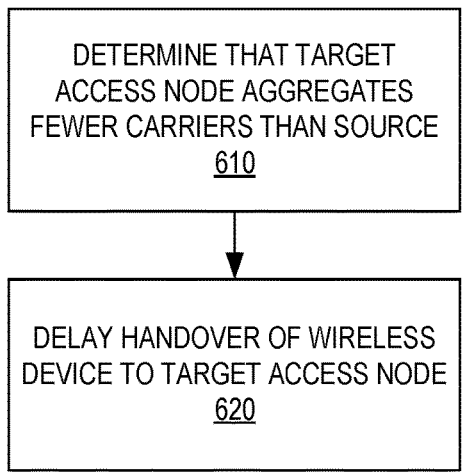
FIG. 6 depicts an exemplary method for delaying handovers based on carrier aggregation capabilities.

FIG. 6 depicts an exemplary method for delaying handovers. The method of FIG. 6 may be implemented by a processing node communicatively coupled to one or more access nodes, controller nodes, or any other network node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, it is determined that a target access node is configured to aggregate fewer carriers than a source access node (or none at all), and at 620, a handover of the wireless device to the target access node is delayed. The handover may initially be required if signal conditions change for the wireless device, or via any other known mechanism for triggering a handover. For example, the wireless device may be near a cell edge of a serving access node, and determines that the signal level of the target access node is acceptable. However, if the target access node is configured to deploy a below-threshold quantity of carriers, such as fewer carriers than the source access node, or none at all, then the handover is delayed. The handover may be delayed by modifying the signal condition thresholds, e.g. minimum or maximum signal levels. Adjusting the handover threshold may include increasing or raising a threshold signal level associated with the target access node. The adjustment may further comprise decreasing or lowering a threshold signal level of the serving access node, such that the wireless device remains attached to the serving access node for a longer time. Handover thresholds may be adjusted for wireless devices that report uplink buffer sizes greater than a threshold uplink buffer size.

Figure 7:
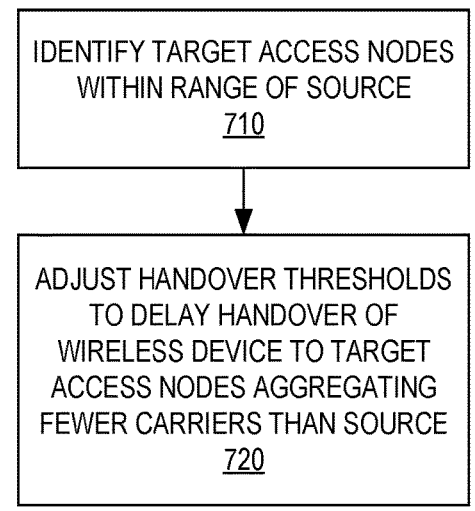
FIG. 7 depicts an exemplary method for adjusting handover thresholds based on carrier aggregation capabilities.

FIG. 7 depicts another exemplary method for delaying handovers. The method of FIG. 7 may be implemented by a processing node communicatively coupled to one or more access nodes, controller nodes, or any other network node. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, target access nodes are identified within range of a wireless device attached to a source access node and, at 720, a handover of the wireless device to those target access nodes that aggregate fewer carriers is delayed. The handover may initially be required if signal conditions change for the wireless device, or via any other known mechanism for triggering a handover. For example, the wireless device may be near a cell edge of a serving access node, and determines that the signal level of the target access node is acceptable. However, if the target access node is configured to aggregate fewer or no carriers then the handover is delayed. Further, the handover may be delayed responsive to the wireless device reporting a high buffer size via, for example, a buffer status report.

Figure 8:
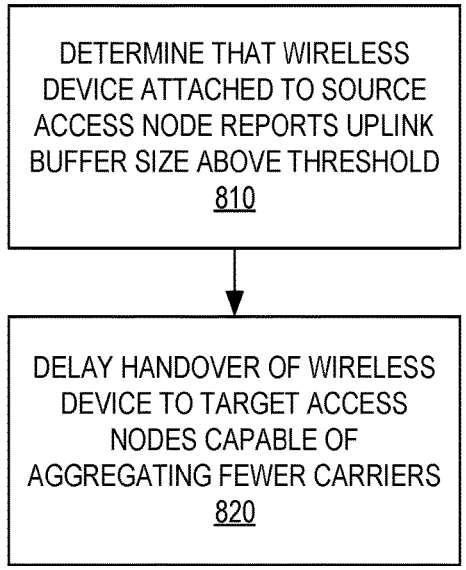
FIG. 8 depicts an exemplary method for delaying handovers for wireless devices with high uplink usage.

FIG. 8 depicts another exemplary method for delayed handovers. The method of FIG. 8 may be implemented by a processing node communicatively coupled to one or more access nodes, controller nodes, or any other network node. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, it is determined that a wireless device attached to a source access node reports an uplink buffer size that is above a threshold. The uplink buffer size may be an average uplink buffer size over a period of time. Further, a handover may be requested if signal conditions change for the wireless device, or via any other known mechanism for triggering a handover. For example, the wireless device may be near a cell edge of a serving access node, and determines that the signal level of the target access node is acceptable. However, if the target access node is not configured to aggregate carriers, or is configure to aggregate fewer carriers than a source access node or some other threshold, then the handover is delayed as described herein.

Additional combinations and permutations of the aforementioned operations may be envisioned by those having ordinary skill in the art in light of this disclosure. Further, while 4G LTE and 5G NR are described in the above embodiments, the disclosed operations may apply to different combinations of radio air interfaces, including any combination of radio air interfaces within the same or different radio-access technologies, such as multiple different 4G carriers, 5G carriers, or any future wireless technology.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for delaying handovers to access nodes based on a carrier aggregation capability, the method comprising:
determining that a target gNodeB is capable of aggregating a smaller quantity of carriers than a source access node in an evolved non-standalone dual connectivity (EN-DC) system comprising one or more 4G LTE eNodeBs and one or more 5G NR gNodeBs serving a wireless device;
determining an uplink buffer size of an uplink buffer of a wireless device attached to the source access node over a configurable time duration;
determining that the wireless device reports the uplink buffer size meeting a threshold as a condition prior to delaying the handover to the target gNodeB in the EN-DC system;
configuring wireless devices with higher uplink usage remain attached to the source access node capable of aggregating more carriers; and
delaying a handover of the wireless device to the target gNodeB in the EN-DC system until the wireless device has emptied the uplink buffer.

2. The method of claim 1 wherein the uplink buffer size is monitored for a configurable time duration.

3. The method of claim 1, wherein delaying the handover comprises adjusting handover thresholds associated with one or both of the source access node or the target gNodeB.

4. The method of claim 3, wherein adjusting the handover thresholds is performed iteratively based on a difference between the quantities of carriers aggregated by the source access node or the target gNodeB.

5. The method of claim 1, wherein the wireless device is configured to utilize a dual-connectivity operating mode with at least a first radio access technology (RAT) and a second RAT, and the carriers being aggregated utilize the second RAT.

6. The method of claim 5, wherein the wireless device is attached to a primary access node via the first RAT, and both the source and target gNodeB comprise secondary access nodes configured to utilize the second RAT.

7. The method of claim 6, wherein the handover is performed using a signaling ratio bearer (SRB).

8. The method of claim 5, wherein both the source access node and the target gNodeB comprise primary access nodes configured to utilize at least the first RAT.

9. A system for delaying handovers to target access nodes with limited carrier-aggregation capabilities, the system comprising:
- a processing node; and
- a processor coupled to the processing node, the processor being configured to perform operations comprising:
  - identifying one or more target gNodeBs within range of a wireless device attached to a source access node in an evolved non-standalone dual connectivity (EN-DC) system comprising one or more 4G LTE eNodeBs and one or more 5G NR gNodeBs;
  - determining an uplink buffer size of an uplink buffer of a wireless device attached to the source access node over a configurable time duration;
  - determining that the wireless device reports the uplink buffer size meeting a threshold as a condition prior to limiting handovers of the wireless device to the one or more target gNodeB in the EN-DC system;
  - configuring wireless devices with higher uplink usage to remain attached to the source access node capable of aggregating more carriers; and
  - limiting handovers of the wireless device to the one or more target gNodeBs that are configured to aggregate fewer carriers than the source access node in the EN-DC system until the wireless device has emptied the uplink buffer.

10. The system of claim 9, wherein the one or more target gNodeBs are identified based on signal levels.

11. The system of claim 10, wherein limiting handovers comprises adjusting threshold signal levels.

12. The system of claim 9, wherein wireless devices for which handovers are limited are those that report threshold uplink buffer sizes.

13. The system of claim 12, wherein the uplink threshold buffer sizes are determined based on buffer status reports received at the source access node from each wireless device.

14. The system of claim 9, wherein the source access node and the one or more target gNodeBs are secondary access nodes communicatively coupled to a primary access node.

15. The system of claim 14, wherein carriers aggregated by one or both of the source access node and one or more target gNodeBs are configured to utilize a different radio access technology (RAT) than the primary access node.

16. A processing node for adjusting handover thresholds for wireless devices with high uplink buffers, the processing node being configured to perform operations comprising:
- identifying one or more target gNodeBs within range of a wireless device attached to a source access node in an evolved non-standalone dual connectivity (EN-DC) system comprising one or more 4G LTE eNodeBs and one or more 5G NR gNodeBs;
- determining an uplink buffer size of an uplink buffer of a wireless device attached to the source access node over a configurable time duration;
- determining that the wireless device reports the uplink buffer size meeting a threshold as a condition prior to adjusting the handover thresholds to the one or more target gNodeBs;
- configuring wireless devices with higher uplink usage to remain attached to the source access node capable of aggregating more carriers; and
- adjusting handover thresholds associated with the one or more target gNodeBs capable of aggregating fewer carriers than the source access node,
- wherein a handover of the wireless device to the one or more target gNodeBs is delayed due to the adjusted handover thresholds until the wireless device has emptied the uplink buffer.

17. The processing node of claim 16, wherein adjusting the handover thresholds is performed iteratively based on a difference between a first quantity of carriers aggregated by the source access node and a second quantity of carriers aggregated by the one or more target gNodeBs.

18. The processing node of claim 16, wherein the wireless device is configured to utilize a dual-connectivity operating mode with at least a first radio access technology (RAT) and a second RAT, and the carriers being aggregated utilize the second RAT.

19. The processing node of claim 18, wherein the source access node and one or more target gNodeBs are secondary access nodes configured to utilize the second RAT.

\* \* \* \* \*